United States Patent
Handley et al.

(10) Patent No.: US 7,386,159 B2
(45) Date of Patent: Jun. 10, 2008

(54) MAGNETIC WATERMARK FOR TEXT DOCUMENTS

(75) Inventors: John C. Handley, Fairport, NY (US); Zhigang Fan, Webster, NY (US); Raphael F. Bov, Jr., Pittsford, NY (US); Ying-wei Lin, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 697 days.

(21) Appl. No.: 10/871,285

(22) Filed: Jun. 18, 2004

(65) Prior Publication Data

US 2005/0281434 A1 Dec. 22, 2005

(51) Int. Cl.
*G06K 9/00* (2006.01)

(52) U.S. Cl. .................. 382/137; 382/243; 380/201

(58) Field of Classification Search ........... 382/100, 382/112, 113–119, 123, 135–140, 168, 174–180, 382/181–193, 232–234, 237–238, 243, 274, 382/278–296, 320, 305; 430/39; 399/49; 380/54, 201

See application file for complete search history.

(56) References Cited

U.S. PATENT DOCUMENTS

| 4,901,114 | A | * | 2/1990 | Parker et al. ............... 399/232 |
| 5,147,744 | A | * | 9/1992 | Sacripante et al. ........... 430/39 |
| 5,341,193 | A | * | 8/1994 | Hubble et al. ................ 399/49 |
| 5,414,783 | A | * | 5/1995 | Bov et al. .................... 382/320 |
| 6,611,598 | B1 | * | 8/2003 | Hayosh ........................ 380/54 |
| 7,221,800 | B2 | * | 5/2007 | Sesek et al. ................ 382/229 |

* cited by examiner

*Primary Examiner*—Seyed Azarian
(74) *Attorney, Agent, or Firm*—Basch & Nickerson LLP

(57) ABSTRACT

The present invention is a method and apparatus for applying magnetic ink character recognition (MICR) technology to enable the embedding of coded information within text characters of a document.

11 Claims, 6 Drawing Sheets

MAGNETIC WATERMARK FOR TEXT DOCUMENTS

This invention relates generally to the authentication of documents via watermarking, and more particularly to a method and apparatus enabling the watermarking of documents using magnetic marking materials, wherein the magnetic marking material is used to render text characters and is, therefore, not visible to the human eye.

BACKGROUND AND SUMMARY OF THE INVENTION

The present invention is based upon well-known magnetic ink character recognition (MICR) technology, but employs the technology in a manner so as to enable the encoding of data using the magnetic marking material within text characters, or portions thereof, and similar symbols or aspects of a document. The advantages of the present invention is that it provides a method to produce an encoded document, where the encoding or "watermark" is visually undetectable, but adequate to indicate authenticity of the document.

Heretofore, a number of patents and publications have disclosed magnetic ink character recognition devices and technology. The following patents are hereby incorporated by reference in their entirety, and the relevant portions may be briefly summarized as follows:

U.S. Pat. No. 4,901,114 to Parker et al., for "TRI LEVEL XEROGRAPHY USING A MICR TONER IN COMBINATION WITH A NON-MICR TONER," issued Feb. 13, 1990, teaches single-pass tri-level xerography employed in an electronic printer to superimpose, with perfect registration, two images, one of which is printed with magnetic (MICR) toner, and the other of which is printed with non-magnetic toner. This permits the MICR toner to be used to print only those parts of the image that are necessary for the magnetic ink character recognition system to read the encoded information;

U.S. Pat. No. 5,147,744 to Sacripante et al. for "MICR PROCESSES WITH COLORED ENCAPSULATED COMPOSITIONS," issued Sep. 15, 1992 discloses colored magnetic encapsulated (MICR) toner compositions, including those comprised of a core of polymer binder, a color pigment or dye, metal magnetic material, and a whitener, and thereover a polymeric shell prepared, for example, by interfacial polymerization and wherein the shell can have incorporated therein, thereon, or combinations thereof certain conductive metal oxide powders; and U.S. Pat. No. 5,414,783 to Bov, Jr. et al. for a "WRITE HEAD FOR A MICR READER HAVING AN ADJUSTABLE FIELD PROFILE," issued May 9, 1995, teaches improvements in apparatus and methods for recognizing characters printed in magnetic ink on documents.

Conventional watermarking methods typically work on grayscale or color images; they modify the grayscale or color of the image in some fashion. Such methods, besides lacking robustness when the document is printed, are awkward in dealing with black and white text documents where the pixel value is either 1 or 0. Other methods, such as shifting the characters are not robust and may carry very little load. Printing yellow dots has been applied in color hardcopies. Such methods rely on the assumption that the paper used is white, if a colored paper is used, or the paper has colored texture or colored designs, the small yellow dots can no longer be detected. Although the yellow dots are easily duplicated using regular inkjet printers, and easily detected using a blue filter, it is, nonetheless, useful in some applications.

In order to provide traceability or the ability to authenticate black and white text documents, the present invention "hides" or encodes information in the printed image. Hiding information may also be useful for other applications, such as usage rights control. Conventional digital watermarking methods are awkward in dealing with this kind of documents. We propose a method and a complete system to put magnetic watermarks in black symbols.

In accordance with the present invention, there is provided a text document authentication method, comprising the steps of: creating a document, where said document has text thereon; creating at least a portion of the text thereon with a combination of marking materials, including a first, visually perceptible marking material and a second, visually perceptible material, wherein the second marking material further includes a detectable, yet not visually perceptible, characteristic so as to be distinguishable from the first marking material with an aid, and where placement of the second marking material is indistinguishable to the unaided eye, yet is in a predefined pattern signifying the authenticity of the document containing such a pattern; and reading the second marking material pattern, with the aid, so as to verify the authenticity of the document, said reading step being sensitive to the presence of the detectable characteristic of the second marking material so as to identify the predefined pattern.

In accordance with another aspect of the present invention, there is provided a method for text document authentication, comprising the steps of: encoding a text image by analyzing the image to identify regions thereof suitable for rendering with a magnetic marking material, and indicating such areas in a digital document; writing the digital document using at least two different marking materials, one of which is a magnetic material, to render text on a marking medium; subsequently reading, from the marking medium, regions having magnetic material therein and sensing the relative strength of such regions so as to determine if such regions exhibit high or low magnetic fields; and based upon the strength of the fields, and the sequence thereof, decoding the signals so as to extract digital data represented by the magnetic marking material.

In accordance with yet another aspect of the present invention, there is provided a system for magnetically watermarking a text document for authentication, comprising: an encoder, operating on a digital text document to analyze the document to identify text regions thereof suitable for rendering with a magnetic marking material, and indicating such areas in the digital document; an image output device suitable for writing the digital document using at least two marking materials, one of which exhibits magnetic characteristics, so as to render the document on a marking medium, wherein regions of the text on said document are rendered with magnetic marking material and exhibit one of at least two levels of magnetic fields so as to provide an encoded magnetic mark within the text; a reader for sensing, on the marking medium, those text regions having magnetic material therein and sensing the relative strength of such regions so as to determine if such regions exhibit at least a high and a low magnetic field strength; and a decoder, for receiving a sequence of high and low magnet field strength signals from the reader and decoding the sequence of signals so as to extract digital data represented by the magnetic marking material.

One aspect of the invention is based on the discovery of a technique to enable the traceability or verification of the authenticity of text documents. Often, such documents are in traditional black and white, or at least the text therein is black and white. The techniques of the present invention utilize the text image areas to "hide" or embed information in the printed document through the use of magnetic inks, toners or similar marking materials. Such materials may be employed to print particular portions of certain characters so as to provide a magnetic mark on the characters, where the sequence of the marks, or the presence of marks may indicate further information relative to the document. In other words, the magnetic marks may provide "hidden" data serving to authenticate the document. A system implementing the invention would include an encoder and writer or printer on the one hand, and a scanner or similar reader and decoder on the other hand. The technique described above is advantageous because it is efficient and less detectable compared to other approaches of document authentication. The techniques can be adapted to any of a number of document types. As a result of the invention, it is possible to employ known technology to produce watermarked or self-authenticating documents.

Figure 1:
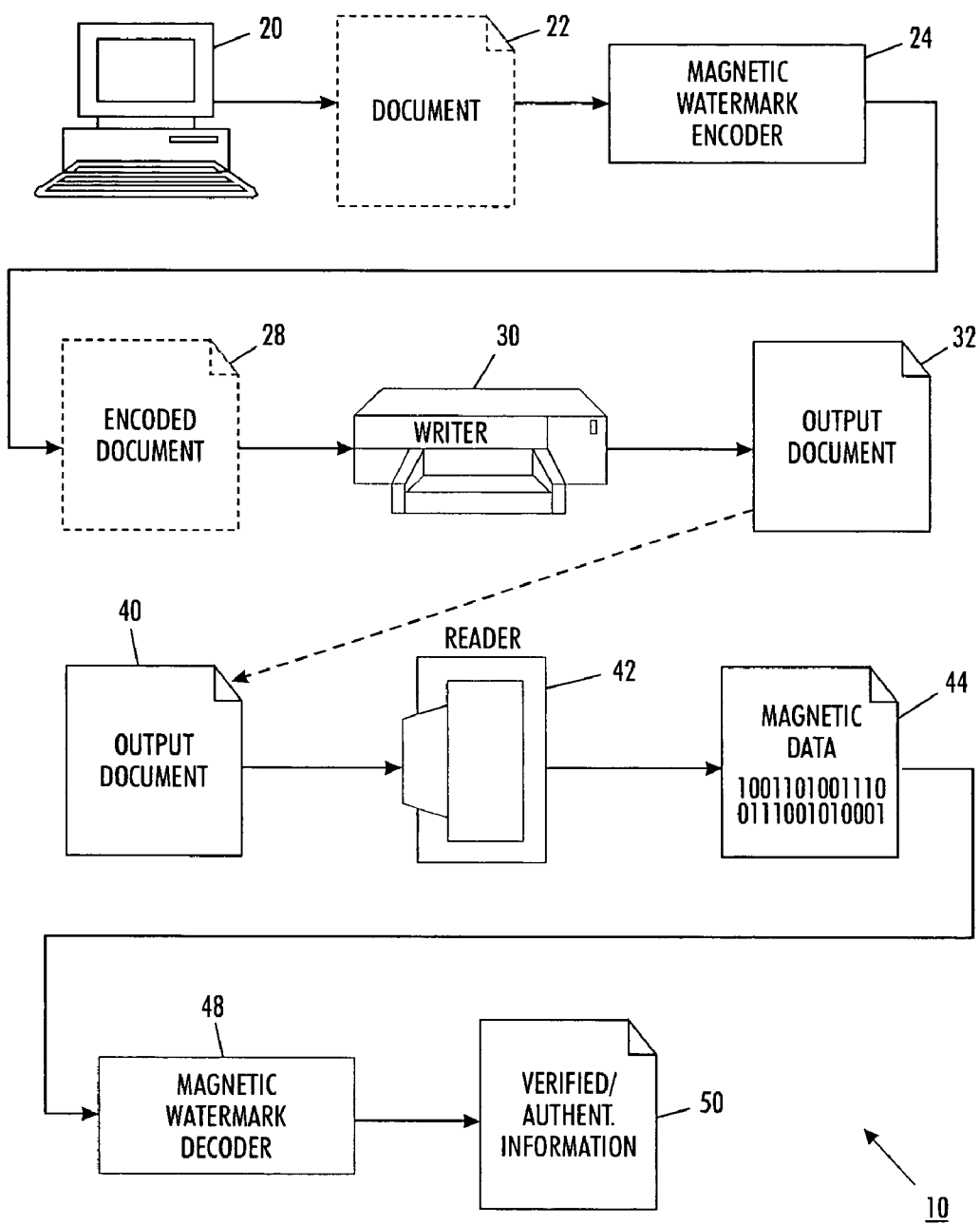
FIG. 1 is a data flow diagram generally illustrating a system and associated processes in accordance with an aspect of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

A set of marks in an image is "encoded" when an item of data defining the portion of the image that includes the marks can be used to obtain an item of data not visually perceptible from the marks themselves. The act of obtaining the item that indicates a decoding may be called "decoding the marks."

A "marking medium" is a physical medium on which a human can produce a pattern of marks by performing marking actions or by performing actions that modify marks, such as erasing, wiping, or scratching actions. Common examples of marking media include sheets of paper and plastic, although humans can produce patterns of marks on an enormous variety of media. As used herein, "marking medium" covers one or more distinct units of a medium on which, together, a human has produced a pattern of related marks. For example, a set of paper pages that form a handwritten letter would be a single marking medium.

The term "mark" includes a single mark and also plural marks that together form a pattern of marks. "Marking material" is any material that, when placed or rendered on a marking medium, is visually perceptible. In the following discussion, the term marking material is understood to include toners, inks and similar materials.

"Character" means a discrete element that appears in a written or printed form of a language. Characters in the English language can thus include not only alphabetic and numerical elements, but also punctuation marks, diacritical marks, and symbols such as mathematical and logical symbols, and other elements used in written or printed English. More generally, characters can include, in addition to alphanumeric elements, phonetic, videographic, or pictographic elements.

A "stroke" is a mark that appears in a written or printed form of a language. Each character can be formed of one or more strokes, or a single stroke may form more than one character in a cursive script.

A "text" is a sequence of characters; the characters of a text may form words and other subsequences within the text.

An "image input device" is a device that can receive an image and provide an item of data defining a version of the image. A "scanner" is an image input device that receives an image by a scanning operation, such as by scanning a document.

An "image output device" is a device that can provide output defining an image.

Although the present invention is described and characterized with respect to embodiments using magnetic materials (i.e., MICR), it will be appreciated that the present invention is equally applicable to other types of marking materials having properties that are not visually perceptible. Accordingly, the present invention is intended to cover such materials in the same manner as described relative to magnetically recognizable materials.

Referring to FIG. 1, there is depicted a data flow diagram generally depicting a system and method to accomplish the present invention. The system 10 may include an encoder 24, a writer 30 or similar image output device, a reader 42 or similar image input device, and a decoder 48. The message is coded as a series of 1's and 0's. As further illustrated, the system includes a computer or similar page composition system 20. It will be appreciated that this composition device may also be an image input device such as a scanner or digital copier, all of which are suitable for generating a digital rendition of a document as depicted by document 22. The digital rendition of the document is then passed to the encoder 24, and the encoder extracts interior pixels of long, vertical strokes of a text image, and such strokes will be given one of two states: 1 or 0, depending upon the desired data element to be written. The encoded document 28, as generated by the encoder 24, is then passed to the writer 30 which may be any suitable image output device.

In one embodiment, the writer 30 has the capability of providing two black marking stations, where one marks with magnetic material (e.g., black toner/ink), and the other with non-magnetic material (e.g., regular black toner/ink). It will be appreciated that the writer may employ tri-level xerographic technology as described in U.S. Pat. No. 4,901,114, as incorporated above, to depict the magnetic and non-magnetic marks as toner images. It will also be appreciated that alternative marking technologies (e.g., inks, overcoats, etc.), and their respective marking devices, may be employed in a similar manner. The primary requirement of such system being the ability to render similarly-colored marks using two types of marking materials—one being magnetic and the other being non-magnetic, or at best, weakly magnetic. Furthermore, the color of the marking material is described herein as black, but it is also possible to employ alternative toner and ink colors as is illustrated by U.S. Pat. No. 5,147,744 to Sacripante et al.

In the writer 30, if a stroke is intended to represent state 1, the significant portion of the vertical length will be marked with magnetic toner/ink, and if a stroke is represent state 0, only half of the vertical length will be marked with magnetic toner/ink. It may also be possible to overprint the coding strokes. It is also possible to utilize alternative techniques to "write" the encoded information—for example, where a predetermined or particular spacing for the magnetic toner is employed. The advantages of using the half/whole stroke method, as will be more specifically described below, is that the encoding is essentially self-clocking, and is not based upon particular character spacing.

Once output by the writer, hardcopy document 32 may be used, sent, stored, etc. As illustrated in the lower half of FIG. 1, when an output document is received by someone desiring to verify its authenticity or to otherwise read the information recorded via the magnetic marking material, it is fed through a reader 42. The reader would likely have a permanent magnet and a MICR read head mounted on a rail in a manner similar to that employed for dot matrix and ink-jet printing system (capable of moving back and forth across a page). As the read head makes one sweep it reads one strip of the image, then the paper is advanced, and the next strip is read. The magnetic marking material strokes are detected, and the state determined to decode the message using decoder 48. Output from the decoder may be a simple verification or authentication message, or it may be a complex representation of data stored on the page. It will also be appreciated that the data may include redundancy and error-correcting information so as to make it robust and self-verifying.

Figure 2:
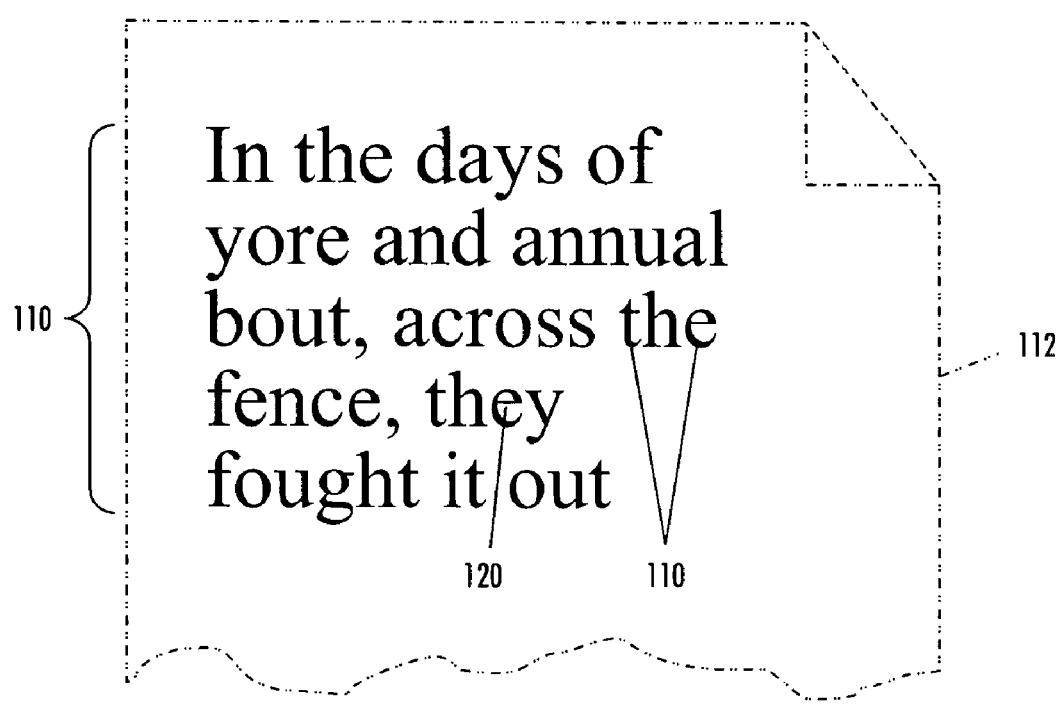
FIG. 2 is an illustrative example of text document.

Having described the general system and its method of operation, attention is now turned to FIGS. 2 through 7, which describe and illustrate in more detail, several aspects of the invention. FIG. 2 depicts a text portion 110 of a document 112. To encode information in a binary text image, it is necessary to decide on the image component to use for this purpose. One possibility is to use long vertical strokes as will be described in more detail below. Alternatively, connected components 120, individual characters 124, or leading characters in words may be employed as the components to be rendered with the magnetic marking material. Alternatively, ascenders (e.g., tops of "l" "d") or descenders (e.g., bottoms of "p" "y") may be used for the encoding.

Figure 3:
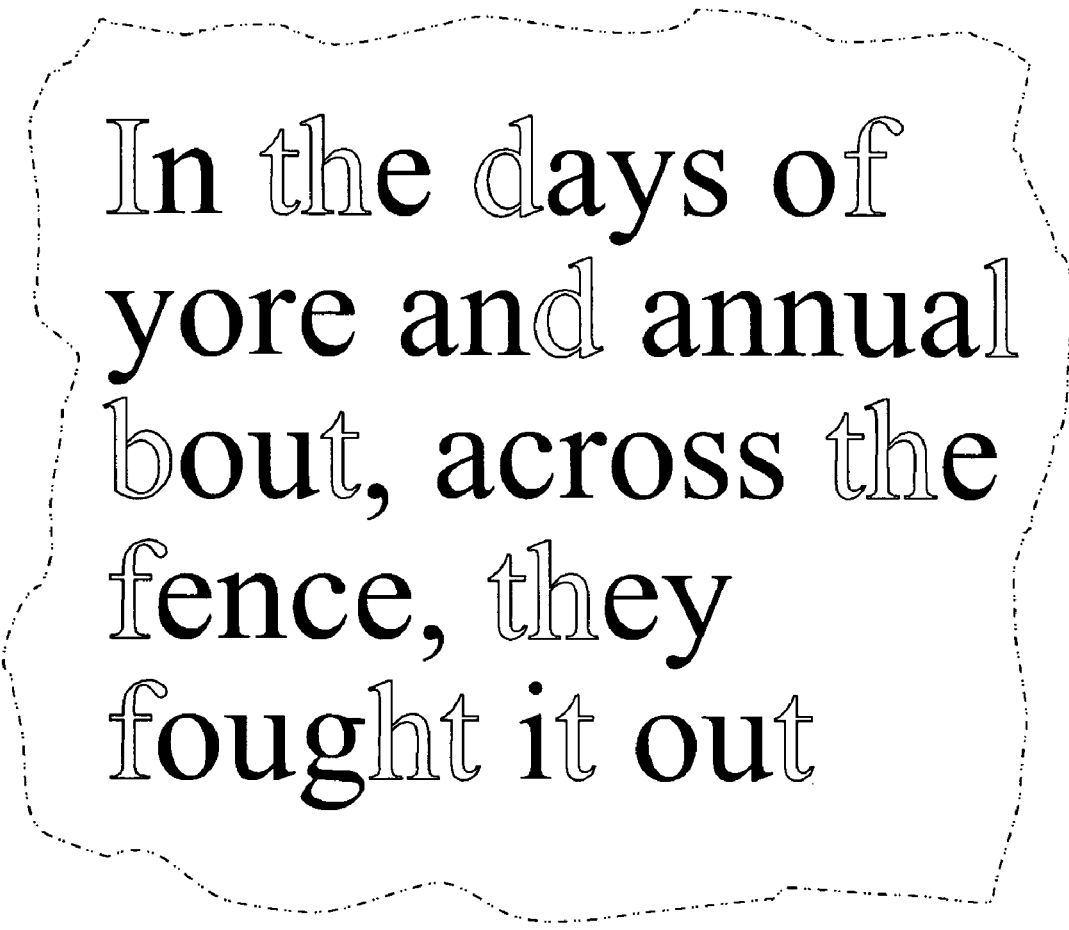
FIG. 3 is an enlarged version of the text document of FIG. 2, showing those characters having vertical strokes present.

Referring to FIG. 3, as described above, one embodiment uses vertical strokes for the encoding. Therefore, the encoder processes the bit map of the image to be printed to identify letters with long vertical strokes, such as in the letters "b," "d," "h," "l," etc. To illustrate this possibility, those characters having longer vertical strokes are indicated in outline form in the text. The encoder then extracts the interior pixels of such strokes. If the resulting area is too small, it is then rejected. Although the size requirement may be determined empirically, and is dependent upon the respective resolution of the writers and readers, the smallest feature in the MICR font can be used as a guide. For a large black symbol (e.g. characters of large sizes, logos) that may contain more than one vertical stroke, multiple bits might be coded. Also, since it is only necessary to distinguish among three states (magnetic 1, magnetic 0, non-magnetic) for well-separated strokes, the gain in the reader can be increased to detect a smaller mass of magnetic toner than that of the MICR fonts. The reason for using long vertical strokes is to facilitate detection by the reader; and the reason for using the interior pixels is to ease the requirement on registration accuracy for the writer or output device. In general, the marking station to marking station registration accuracy is expected to be approximately 1 pixel.

Figure 4:
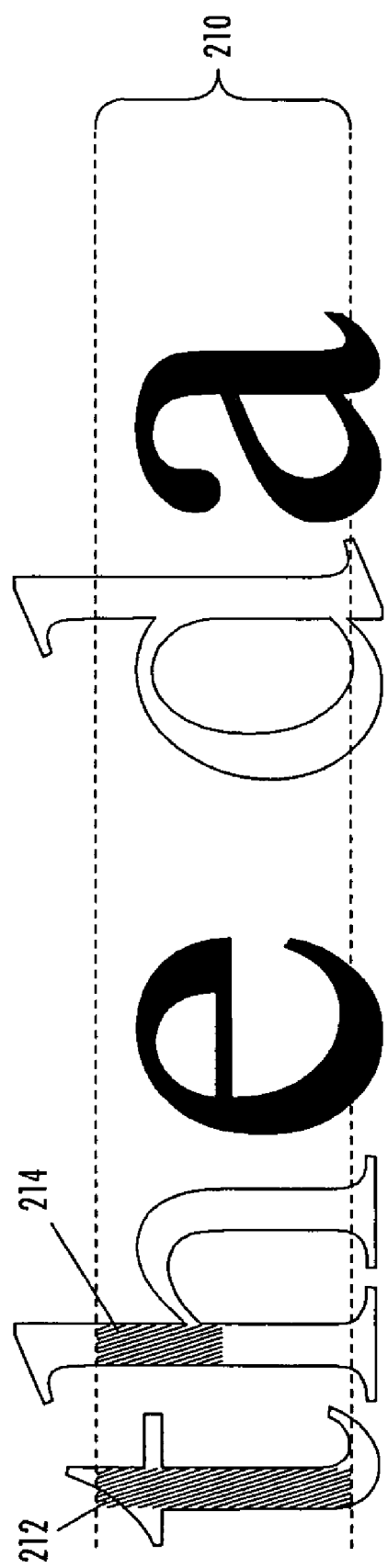
FIG. 4 is an enlarged rendition of characters from FIGS. 2 and 3, showing the details of the manner in which the characters are encoded in accordance with an aspect of the present invention.

Referring now to FIG. 4, a portion of the text from FIGS. 2 and 3 is illustrated in an enlarged format. In the text, the region of the vertical strikes is illustrated by reference numeral 210. Each extracted vertical stroke is then assigned one of two states: 1 or 0, based on the coded message. As illustrated in FIG. 4, the "t" is encoded using magnetic toner in region 212, while the "h" is encoded using the magnetic toner in region 214. The heights of the regions are intentionally distinct as one is indicative of a 0 while the other a 1. To improve tolerance to document skew for closely spaced text, it may be possible to use every other line to carry the coded message.

Figure 5:
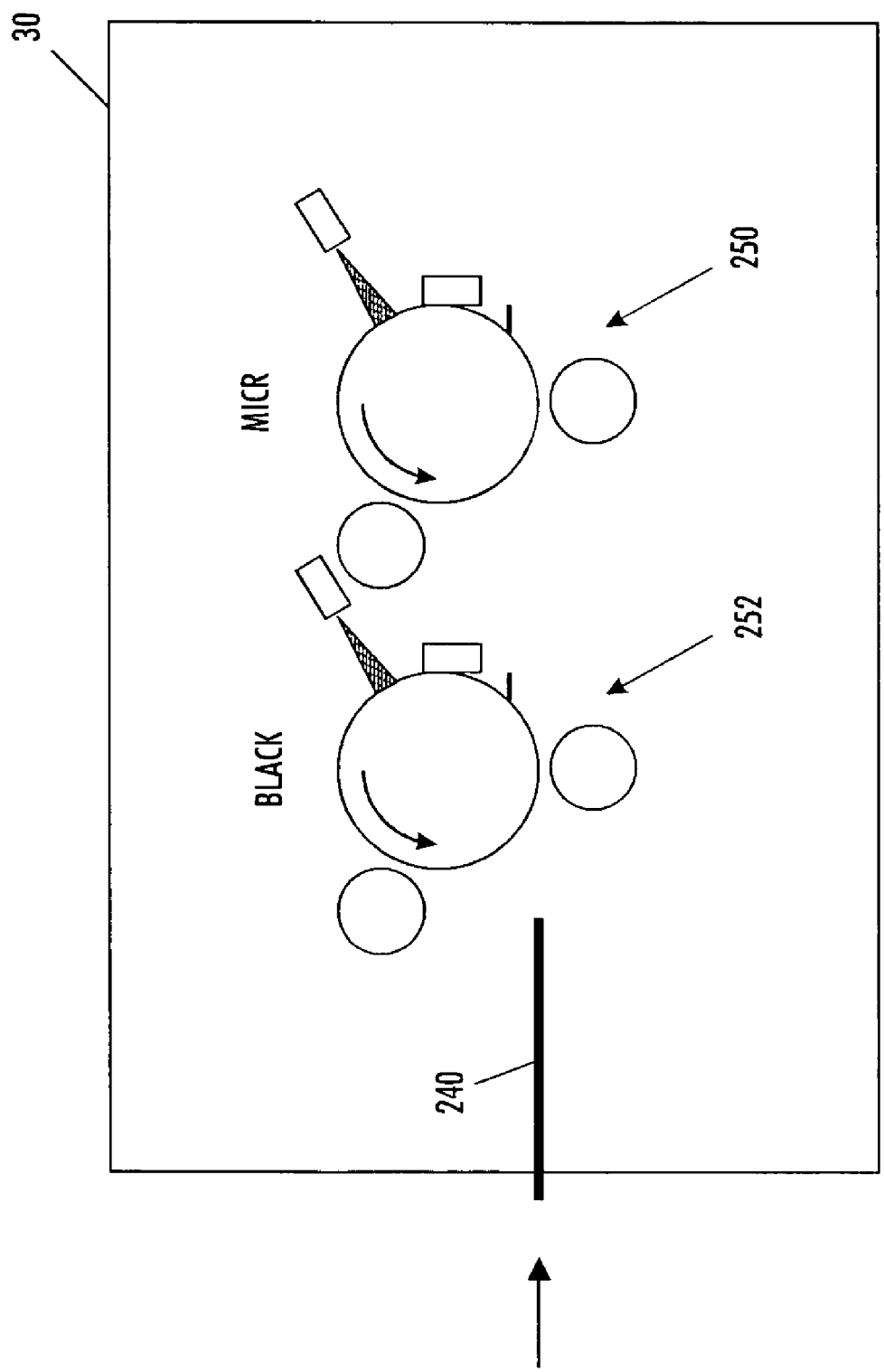
FIG. 5 is a simplified example of a xerographic marking device in accordance with an aspect of the present invention.

In the embodiment of FIG. 5, the writer 30 is a device with at least one xerographic print engine 250 for placing marks or rendering an image on a marking medium or substrate 240 as it is fed through the writer. The writer may include two black stations; station 250 uses magnetic black toner while station 252 uses regular black toner. Although depicted with a pair of print engines, it is also conceivable that the writer is a marking device as described in U.S. Pat. No. 4,901,114 to Parker et al., incorporated above, where a tri-level xerographic engine is employed to image both black and MICR. In Xerox® MICR printers, the magnetic toner uses the same resin as regular black toner, and carbon black added to the magnetic toner to make equally black as the regular toner, therefore, there should not be any difference in the appearance on the print whether an area is printed with one toner or the other.

Figures 6, 7:
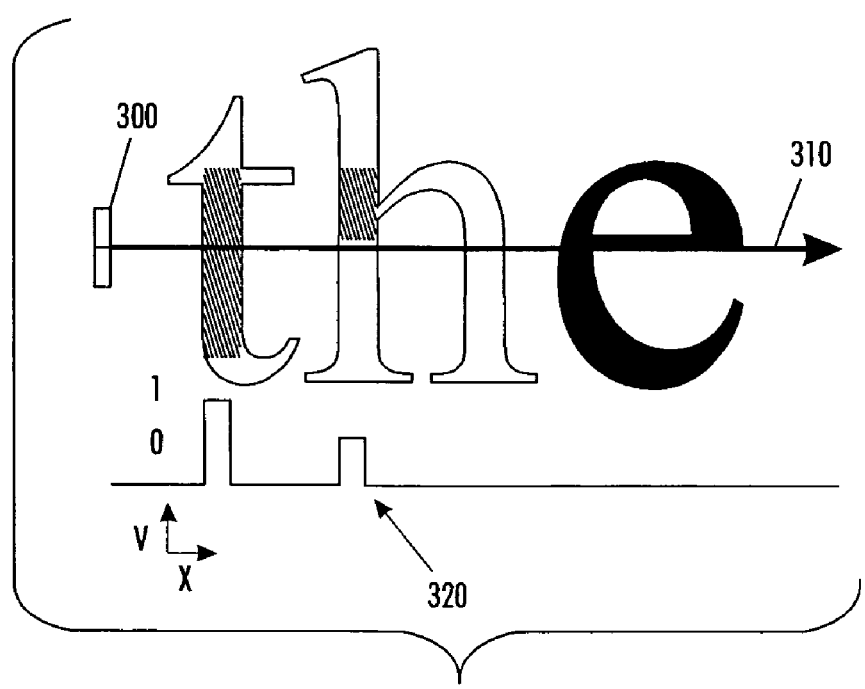
FIG. 6 is an enlarged rendition of characters from FIG. 4, showing the details of the manner in which the characters are rendered in accordance with an aspect of the present invention.
FIG. 7 is a representation of a reader suitable for reading the encoded characters of FIG. 6 and a read head for use in accordance with the present invention.

All pixels in the extracted vertical strokes that are in state 1 will be printed with magnetic toner over a substantial length of the vertical stroke as depicted in FIG. 4, whereas half of the pixels (say the top half) in the extracted vertical strokes that are in state 0 will be printed with magnetic toner. All other places will be printed with non-magnetic toner such that the finished output will appear as a typical text document upon visual inspection. FIG. 6 is representative the output, albeit the magnetic regions 212 and 214 are illustrated in a crosshatched fashion. Alternatively, it is conceivable that all pixels are printed with non-magnetic toner, then selectively over-printed with magnetic toner. Registration accuracy is less of a concern in the latter case, however, the drawback is some variation in the darkness of printed characters, which may not be noticeable. It the print engine of the writer uses xerography, the second development station needs to be scavenge-less. In addition to tri-level xerography, as described above, other possible marking technologies include image-on-image. Another possibility is to use solid or liquid inkjet for the print engine.

Referring now to FIG. 7, operation of the reader will be described. As noted above, the reader may be a MICR-sensitive head mounted on a page-width scanning carriage (not shown) as is well-known for dot-matrix and ink-jet output devices, but in this case adapted as an input device. In this manner, the marked medium may be "scanned" using a read head 300 as illustrated in the figure. More specifically, reading head assembly 300 would likely include a permanent magnet plus a regular MICR or magnetic read head (e.g., a credit card read head). The reading head assembly is mounted on a rail (not shown) so as to be constrained to move across a page in the direction indicated by arrow 310. By moving the assembly from one end of the rail to the other, one strip of a page can be read and the relative motion between the read head and the magnetic marking material is provided. As illustrated by the output waveform 320, the read head 310 produces a signal indicative of the magnetic field sensed as the head passes over the magnetic marking material. Although the head may operate to produce an analog signal, it will be appreciated that suitable processing can be employed to render the desired digital (0, 1) output. After the first strip is read, the paper is advanced one step, and the head assembly is swept through its width again to read the next strip. It will be appreciated that the reading head may operate to read in the opposite direction, but that data collected would need to be buffered so as to allow it to be reversed. By repeating the line reading process, the entire page can be read.

The MICR read head 300 output is proportional to the derivative of the toner mass of a magnetized stroke. The higher the mass of the stroke, the greater the peak value of the derivative. Hence by detecting the peak height of the MICR read head output, we can determine the state of a magnetic stroke: 1 or 0. Signals from all other areas will be ignored. This series of binary values can then be decoded. It is also possible to split the read head 300, as illustrated in FIG. 7, so that a top half of the head reads the "timing marks" or those vertical strokes that are encoded by printing with magnetic marking material. The lower half of each vertical stroke then is the binary data, with magnetic material present for a 1 and conventional, non-magnetic material present for a 0.

A MICR read head covers a width of about 0.25 to 0.625 inches, and credit card read heads are substantially shorter, so this determines the resolving power in the y direction. To avoid aliasing problems, the sampling step size in the y direction can be reduced to, say, one-half of the read head gap height. In the x direction, the magnetic signal can be digitized at sufficient resolution to resolve the closest vertical lines expected. Output from the reader 42 is sent to the decoder 48 as described with respect to FIG. 1. The coding method used in the encoder needs to take the asymmetry in the resolution of the reader into consideration. MICR read heads that have a matrix of sensors exist, but they may be too expensive to contemplate for this application. It is also possible that the magnetic read head may be sensitive to the magnetic marking material without relative motion between the read head and the substrate.

In its simplest form, the entire document is a binary bit, where any presence of magnetic ink is a sign of document authenticity. However, the methods described herein greatly expand the data capacity beyond a single bit—permitting a much wider range of applications. Traceability and the identification of the entity or equipment producing the document are examples of the application of the present invention. The ability to add data also enables use of public or private key cryptography in a similar manner to its use in electronic transactions, it allows authentication of the producer and validation of the data contained on the document. In addition to detection of duplication, a message authentication code could be used to detect alteration of pertinent data on the document. Such procedures would permit secure document applications such as stock certificates and motor vehicle titles. Once printed, detection systems could be easily automated as systems already exist for scanning specific areas of a document. Modifications to add multiple scan areas are straightforward and given the extremely simple signals involved, high reading speed is achievable.

In recapitulation, the present invention is a method and apparatus for applying magnetic ink character recognition (MICR) technology to enable the embedding of coded information within existing text characters of a document. It is, therefore, apparent that there has been provided, in accordance with the present invention, a method and apparatus for creating magnetically "watermarked" text documents. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A text document authentication method, comprising the steps of:
    creation a document, where said document has text thereon;
    creation at least a portion of the text with a combination of marking materials, including a first, visually perceptible marking material and a second, visually perceptible marking material, wherein the second visually perceptible marking material further includes a detectable, yet not visually perceptible, characteristic so as to be distinguishable from the first marking material with an aid, and the detectable characteristic is a magnetic field, and where placement of the second visually perceptible marking material is indistinguishable from the first visually perceptible marking material to the unaided eye, yet is in a predefined pattern signifying the authenticity of the document containing such a pattern, said second visually perceptible marking material is a magnetic marking material employed to print only a portion of text characters along a line of text, wherein the portion of the text characters is a vertical stroke, and where a first binary value is distinguished from a second binary value based upon the strength of the magnetic field, and
    reading the second marking material pattern, with the aid, so as to verify the authenticity of the document, said reading step being sensitive to the presence of the detectable characteristic of the second marking material so as to identify the predefined pattern.

2. The method of claim 1, wherein the magnetic field strength is varied by altering the length of a magnetic marking material region in the vertical stroke.

3. A method for text document authentication, comprising the steps of:
    encoding a text image by analyzing the image to identify regions thereof suitable for rendering with a magnetic marking material, and indicating such areas in a digital document;
    writing the digital document using at least two different marking materials, one of which is a magnetic material, to render text on a marking medium;

subsequently reading, from the marking medium, regions having magnetic material therein and sensing the relative strength of such regions so as to determine if such regions exhibit high or low magnetic fields; and based upon the strength of the fields, and the sequence thereof, decoding the signals so as to extract digital data represented by the magnetic marking material.

4. The method of claim 3, where the encoding and writing steps include identifying vertical strokes in the text image and rendering at least portions of such vertical strokes with the magnetic material so as to produce regions having varying magnetic fields.

5. The method of claim 3, wherein the text is encoded and at least portions of text characters are written with the magnetic marking material, and where the portions of text are selected from the group consisting of:
- vertical strokes;
- vertical ascenders;
- vertical descenders;
- an entire character; and
- connected character components.

6. The method of claim 3, wherein the magnetic marking material is a component of a xerographic toner.

7. The method of claim 3, wherein the magnetic marking material is a xerographic toner.

8. The method of claim 3, wherein the text is encoded and at least portions of text characters are written with the magnetic marking material, and where the portion of the text characters is a vertical stroke, and where a first binary value is distinguished from a second binary value based upon the strength of the magnetic field generated by the vertical stroke.

9. The method of claim 8, wherein the magnetic field strength is varied by altering the length of a magnetic marking material region in the vertical stroke.

10. A system for magnetically watermarking a text document for authentication, comprising:

an encoder, operating on a digital text document to analyze the document to identify text regions thereof suitable for rendering with a magnetic marking material, and indicating such areas in the digital document; and an image output device suitable for writing the digital document using at least two marking materials, one of which exhibits magnetic characteristics, so as to render the document on a marking medium, wherein only portions of characters within the text on said document are rendered with magnetic marking material and exhibit one of at least two levels of magnetic fields so as to provide an encoded magnetic watermark within the text;

a reader for sensing, on the marking medium, those text portions having magnetic material therein and sensing the relative strength of such regions so as to determine if such regions exhibit at least a high and a low magnetic field strength; and a decoder, for receiving a sequence of high and low magnet field strength signals from the reader and decoding the sequence of signals so as to extract digital data represented by the magnetic marking material.

11. The system of claim 10, wherein the reader includes a MICR read head suitable for reading magnetic material in a vertical stroke of text, wherein the read head is capable of detecting the presence and absence of the magnetic material in an upper and a lower portion of the vertical stroke.

* * * * *